United States Patent
Song et al.

(10) Patent No.: US 11,220,463 B2
(45) Date of Patent: Jan. 11, 2022

(54) RED ZIRCONIUM-OXIDE SINTERED BODY, PREPARATION METHOD AND USE

(71) Applicant: SHANDONG SINOCERA FUNCTIONAL MATERIAL CO., LTD., Shandong (CN)

(72) Inventors: Xibin Song, Shandong (CN); Bing Zhang, Shandong (CN); Xi Zhang, Shandong (CN)

(73) Assignee: Shandong Sinocera Functional Material Co., Ltd., Shandong (CN)

( * ) Notice: Subject to any disclaimer, the term of this patent is extended or adjusted under 35 U.S.C. 154(b) by 0 days.

(21) Appl. No.: 16/771,775

(22) PCT Filed: Jun. 13, 2019

(86) PCT No.: PCT/CN2019/091088
§ 371 (c)(1),
(2) Date: Jun. 11, 2020

(87) PCT Pub. No.: WO2020/224030
PCT Pub. Date: Nov. 12, 2020

(65) Prior Publication Data
US 2021/0139378 A1    May 13, 2021

(30) Foreign Application Priority Data
May 5, 2019  (CN) .......................... 201910367575.X

(51) Int. Cl.
*C04B 35/488* (2006.01)
*C04B 35/64* (2006.01)

(52) U.S. Cl.
CPC ........ *C04B 35/4885* (2013.01); *C04B 35/488* (2013.01); *C04B 35/64* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3229* (2013.01); *C04B 2235/3244* (2013.01); *C04B 2235/5445* (2013.01); *C04B 2235/6581* (2013.01); *C04B 2235/661* (2013.01); *C04B 2235/785* (2013.01); *C04B 2235/9661* (2013.01)

(58) Field of Classification Search
CPC .. C04B 35/486; C04B 35/488; C04B 35/4885
See application file for complete search history.

(56) References Cited

U.S. PATENT DOCUMENTS

| 9,249,057 B2 * | 2/2016 | Tsukuma .............. B82Y 30/00 |
| 10,550,040 B2 * | 2/2020 | Yamauchi ............. C01G 25/02 |
| 2013/0037763 A1 * | 2/2013 | Tsukuma ............. C04B 35/486 252/584 |
| 2018/0222799 A1 * | 8/2018 | Yamauchi ............. C01G 25/02 |

FOREIGN PATENT DOCUMENTS

| CN | 102791653 A | 11/2012 |
| CN | 107032787 A | 8/2017 |
| CN | 107445612 A | 12/2017 |
| CN | 107922272 | 4/2018 |
| CN | 107922272 A | 4/2018 |
| EP | 1076036 | 10/2003 |
| JP | 62083366 A * | 4/1987 |

OTHER PUBLICATIONS

English translation of an Office Action for the corresponding Chinese priority application No. 201910367575 X.
OA2 of priority document CN 201910367575X.
Notification to Grant Patent Right for Invention of priority document CN 201910367575X.

* cited by examiner

*Primary Examiner* — Karl E Group
(74) *Attorney, Agent, or Firm* — Barnes & Thornburg LLP

(57) ABSTRACT

A red zirconium-oxide sintered body includes oxide of cerium, auxiliary metal oxide and oxide of zirconium, wherein the auxiliary metal oxide includes any one or a combination of at least two of oxide of yttrium, oxide of magnesium, oxide of calcium and oxide of ytterbium; the red zirconium-oxide sintered body satisfies conditions that the oxide of cerium has a content of 0.2~1.5 mol %; the oxide of cerium comprises trivalent cerium oxide; a sum of contents of the oxide of cerium and the auxiliary metal oxide is 1.1~2.5 mol %; and the sintered body has fracture toughness≥8 MPa·m$^{1/2}$. The zirconium-oxide sintered body has red appearance and toughness more than 8 MPa·m$^{1/2}$, and can be used for products such as mobile phone backboards, ornaments and dial plates.

18 Claims, No Drawings

RED ZIRCONIUM-OXIDE SINTERED BODY, PREPARATION METHOD AND USE

CROSS-REFERENCE TO RELATED APPLICATION

This application is the U.S. national phase of PCT/CN2019/091088, filed on Jun. 13, 2019, which claims the priority to the Chinese patent application with the filing number 201910367575.X filed on May 5, 2019 with the Chinese Patent Office, and entitled "Red Zirconium-Oxide Sintered Body, Preparation Method and Use", the entire disclosures of both of which are incorporated herein by reference.

TECHNICAL FIELD

The present disclosure pertains to the field of ceramic materials, and particularly relates to a red zirconium-oxide sintered body, a preparation method and use.

BACKGROUND ART

The zirconium-oxide ceramic material has excellent characteristics such as relatively high bending strength, hardness, and fracture toughness, and can be widely applied to the fields of energy source, environment and materials. Red as a bright and brilliant color is preferred by consumers, therefore, a red zirconium-oxide ceramic needs to be developed in the art, to be used for exterior members such as decorative parts or electronic devices.

The prior art discloses a method for realizing red coloring of the zirconium-oxide sintered body by reduction of cadmium sulfoselenide red and cerium oxide for color development. The cadmium sulfoselenide red zirconium-oxide ceramic has a sintering temperature of about 1400° C., but cadmium sulfoselenide will be decomposed at a temperature lower than this sintering temperature, and the heavy metal cadmium as a toxic and harmful substance cannot be applied to exterior members. When cerium oxide is used as a coloring agent, cerium is reduced to be trivalence, so as to be red color, but the addition of cerium causes reduction of toughness of the zirconium-oxide sintered body, thus cracks are more easily caused after the zirconium-oxide sintered body is dropped, then the requirements of consumer electronics, ornaments and the like, especially the requirement of the falling ball performance of mobile phone backboard products, cannot be met.

A red zirconium-oxide sintered body having relatively high toughness needs to be developed in the art, of which the relatively high toughness can expand its applications in the fields of consumer electronics, ornaments and so on.

SUMMARY

The present disclosure provides a red zirconium-oxide sintered body, including oxide of cerium, auxiliary metal oxide and oxide of zirconium; and the auxiliary metal oxide includes any one or a combination of at least two of oxide of yttrium, oxide of magnesium, oxide of calcium and oxide of ytterbium;

The red zirconium-oxide sintered body satisfies conditions (1)~(4):

(1) the oxide of cerium has a content of 0.2~1.5 mol %;
(2) the oxide of cerium includes trivalent cerium oxide;
(3) a sum of the oxide of cerium and the auxiliary metal oxide in content is 1.1~2.5 mol %; and
(4) the sintered body has the fracture toughness≥8 MPa·m$^{1/2}$.

In the above, the oxide of cerium is calculated based on $CeO_2$, and the oxide of yttrium is calculated based on $Y_2O_3$.

The red zirconium-oxide sintered body provided in the present disclosure simultaneously satisfies that the oxide of cerium has a content of 0.2~1.5 mol %, the cerium oxide includes the trivalent cerium oxide, the sum of contents of the oxide of cerium and the auxiliary metal oxide is 1.1~2.5 mol %, and the sintered body has the fracture toughness≥8 MPa·m$^{1/2}$.

In the conditions (1)~(4), the trivalent cerium oxide provides a red color tone, if the content of the trivalent cerium oxide is too low, the red appearance cannot be obtained, and if the content of the trivalent cerium oxide is too high, the toughness of the red zirconium-oxide sintered body is reduced. The auxiliary metal oxide serves to improve the toughness of the red zirconium-oxide sintered body, but the addition amount of the auxiliary metal oxide should be appropriately adapted to the content of the trivalent cerium oxide, so as to obtain the sintered body having the red appearance and high toughness. If the sum of the contents of the auxiliary metal oxide and the trivalent cerium oxide is too low, the sintered body is poor in stability and is liable to be broken, and if the sum of the contents of the auxiliary metal oxide and the trivalent cerium oxide is too high, the toughness is reduced instead.

It should be noted that the conditions (1)~(4) provided in the present disclosure are an entirety, cannot be separated from each other, and should be implemented integrally. The conditions (1)~(4) fully consider the relationship among color, toughness and contents of components, and find the key relationship between the content of the oxide of cerium and the content of the auxiliary metal oxide in terms of components.

In one or more embodiments, in the red zirconium-oxide sintered body provided in the present disclosure, the zirconium oxide can be used to make up the sum of various components to 100 mol %.

In one or more embodiments, in the red zirconium-oxide sintered body provided in the present disclosure, the content of the oxide of cerium may be any point value of 0.2~1.5 mol %, for example, 0.3 mol %, 0.5 mol %, 0.8 mol %, 1.0 mol %, 1.1 mol %, 1.2 mol %, 1.3 mol %, and 1.4 mol %.

In one or more embodiments, in the red zirconium-oxide sintered body provided in the present disclosure, the sum of the contents of the oxide of cerium and the auxiliary metal oxide is 1.1~2.5 mol %, for example, 1.3 mol %, 1.5 mol %, 1.8 mol %, 2.0 mol %, 2.1 mol %, 2.2 mol %, 2.3 mol %, and 2.4 mol %. In one or more embodiments, the fracture toughness of the sintered body is ≥8 MPa·m$^{1/2}$ for example, 8 MPa·m$^{1/2}$, 10 MPa·m$^{1/2}$, 11 MPa·m$^{1/2}$, 12 MPa·m$^{1/2}$, 15 MPa·m$^{1/2}$, 18 MPa·m$^{1/2}$, 22 MPa·m$^{1/2}$, 25 MPa·m$^{1/2}$, and 28 MPa·m$^{1/2}$.

It should be noted that in the red zirconium-oxide sintered body according to the present disclosure, the oxide of cerium is calculated based on $CeO_2$, but this does not indicate that the oxide of cerium is present in a form of $CeO_2$ in the red zirconium-oxide sintered body, and instead, the oxide of cerium is present in a form of trivalent cerium oxide in the red zirconium-oxide sintered body.

In one or more embodiments, the three-point bending strength of the sintered body is 1000 MPa, for example, 1100 MPa, 1200 MPa, 1400 MPa, 1700 MPa, 1900 MPa, 2100 MPa, 2500 MPa, 2700 MPa, and 2900 MPa.

The three-point bending strength can reflect the structural stability of the zirconium-oxide sintered body, and the three-point bending strength of ≥1000 MPa proves that the zirconium-oxide sintered body has good thermal stability and has no crack inside the ceramic.

In one or more embodiments, an average grain size of the sintered body is ≤500 nm, for example, 480 nm, 450 nm, 430 nm, 400 nm, 380 nm, 350 nm, 330 nm, 300 nm, 280 nm, 250 nm, 230 nm, 200 nm, 180 nm, 150 nm, 130 nm, 120 nm, 100 nm, 80 nm, 50 nm, and 20 nm.

If the average particle size of the sintered body is too large, the zirconium-oxide sintered body is prone to brittle fracture, the thermal stability of the red zirconium-oxide sintered body is deteriorated, and further the three-point bending strength thereof is affected.

In one or more embodiments, the particle size distribution of the grain size of the sintered body is 15~400 nm, for example, 180 nm, 200 nm, 220 nm, 250 nm, 280 nm, 320 nm, 350 nm, and 380 nm.

In one or more embodiments, the auxiliary metal oxide according to the present disclosure is oxide of yttrium.

In one or more embodiments, the mole percentage of the oxide of yttrium in the red zirconium-oxide sintered body, calculated based on $Y_2O_3$, is 0.8~1.2 mol %.

In one or more embodiments, in the oxide of cerium, the mole percentage of the trivalent cerium, calculated based on cerium atoms, is ≥60% (for example, 65%, 70%, 75%, 80%, 85%, 90%, 95%, 98%, and 100%), preferably ≥80%, and further preferably ≥95%. The trivalent cerium oxide provides the red appearance to the zirconium-oxide sintered body, and the higher the trivalent cerium content is, the higher the effective utilization ratio of cerium atoms is.

In one or more embodiments, the red zirconium-oxide sintered body according to the present disclosure further contains oxide of aluminum.

In one or more embodiments, the mole percentage of the oxide of aluminum in the red zirconium-oxide sintered body, calculated based on $Al_2O_3$, is ≤2.5 mol %, for example, 2.4 mol %, 2.0 mol %, 1.8 mol %, 1.5 mol %, 1.1 mol %, 0.8 mol %, 0.7 mol %, 0.5 mol %, 0.4 mol %, and 0.3 mol %, and preferably ≤1.2 mol %.

The addition of the oxide of aluminum can endow the red zirconium-oxide sintered body with more vivid red color, and it can reduce interference of background color in the application environment of the red zirconium oxide, for example, when the red zirconium-oxide sintered body is used on a black substrate, after the oxide of aluminum is added, the red color displayed will not be blackened because of the black substrate.

In one or more embodiments, the oxide of aluminum includes aluminum oxide, preferably any one or a combination of at least two of $\alpha$-$Al_2O_3$ and $\gamma$-$Al_2O_3$.

In one or more embodiments, in a Lab color system of the red zirconium-oxide sintered body, a value a is ≥25, a ratio of the value a to a value b is ≥0.9, and a value L is ≥20.

The Lab color system is a unified standard for colors in the art, the value a represents a red-green value, and when the value a is a positive value, the bigger the value a is, the higher the red value of color is; the value b represents a yellow-blue value, and when the b value is a positive value, the bigger the value b is, the higher the yellow value is; and the value L represents brightness, and the bigger the value L is, the higher the brightness is.

The red color of the red zirconium-oxide ceramic of the present disclosure is generally recognized red color in the art, and that the value a is ≥25, the ratio of the value a to the value b is ≥0.9, and the value L is ≥20, which should be considered as a preferred range for red color in the present disclosure.

In one or more embodiments, the red zirconium-oxide sintered body of the present disclosure includes, in mole percentage, following components:
0.2~1.5 mol % of oxide of cerium,
0.8~2.0 mol % of oxide of yttrium,
0~2.5 mol % of oxide of aluminum, and
a balance is zirconium oxide.

In the above, a sum of the contents of the oxide of cerium and the oxide of yttrium is 1.1~2.5 mol %.

In one or more embodiments, the red zirconium-oxide sintered body according to the present disclosure includes, in mole percentage, following components:
0.4~1.2 mol % of oxide of cerium,
0.8~1.4 mol % of oxide of yttrium,
0.01~2.5 mol % of oxide of aluminum, and
a balance is zirconium oxide.

In the above, a sum of the oxide of cerium and the oxide of yttrium in content is 1.4~2.2 mol %.

The present disclosure further provides a method for preparing a red zirconium-oxide sintered body, wherein the method includes following steps:
(I) mixing oxide of cerium, auxiliary metal oxide and zirconium oxide according to a molar ratio of conditions (a)~(c) to obtain a mixture to be sintered, wherein the condition (a) is that the oxide of cerium has a content of 0.2~1.5 mol %; the condition (b) is that a sum of contents of the oxide of cerium and the auxiliary metal oxide is 1.1~2.5 mol %; and the condition (c) is that the balance is zirconium oxide; and the auxiliary metal oxide includes any one or a combination of at least two of oxide of yttrium, oxide of magnesium, oxide of calcium and oxide of ytterbium; and
(II) firstly carrying out primary sintering on the mixture obtained in the step (I) under normal pressure, and then carrying out secondary sintering on the mixture under a reducing atmosphere to obtain the red zirconium-oxide sintered body.

In the method for preparing a red zirconium-oxide sintered body provided in the present disclosure, the red zirconium-oxide sintered body provided in the present disclosure can be obtained by satisfying the conditions (a)~(c) and carrying out two times of sintering.

In the method for preparing a red zirconium-oxide sintered body provided in the present disclosure, the manner of sintering for two times can ensure the existence of trivalent cerium, thus endow the sintered body with the red appearance, and meanwhile assist the metal oxide, the oxide of cerium and the oxide of zirconium to be sintered to obtain a mixed crystal with monoclinic phase and tetragonal phase, so as to obtain the zirconium-oxide sintered body with the toughness≥8 MPa·m$^{1/2}$.

In one or more embodiments, the mixture to be sintered in the step (I) further contains oxide of aluminum, preferably less than 2.5 mol % of the oxide of aluminum. For example, in the mixture to be sintered, the content of the oxide of aluminum is, for example, 2.4 mol %, 2.0 mol %, 1.8 mol %, 1.5 mol %, 1.1 mol %, 0.8 mol %, 0.7 mol %, 0.5 mol %, 0.4 mol %, and 0.3 mol %, preferably ≤1.2 mol %.

In one or more embodiments, the mixture to be sintered includes, in mole percentage, following components:
0.2~1.5 mol % of oxide of cerium,
0.8~2.0 mol % of oxide of yttrium,
0~2.5 mol % of oxide of aluminum, and
a balance is zirconium oxide.

In the above, a sum of the contents of the oxide of cerium and the oxide of yttrium is 1.1~2.5 mol %.

In one or more embodiments, the red zirconium-oxide sintered body includes, in mole percentage, following components:
   0.4~1.2 mol % of oxide of cerium,
   0.8~1.4 mol % of oxide of yttrium,
   0.01~2.5 mol % of oxide of aluminum, and
   a balance is zirconium oxide.

In the above, a sum of the oxide of cerium and the oxide of yttrium in content is 1.4~2.2 mol %.

In one or more embodiments, the zirconium oxide has a crystal particle size 500 nm, for example, 480 nm, 450 nm, 430 nm, 400 nm, 380 nm, 350 nm, 330 nm, 300 nm, 280 nm, 250 nm, 230 nm, 200 nm, 180 nm, 150 nm, 130 nm, 120 nm, 100 nm, 80 nm, 50 nm, and 20 nm.

In one or more embodiments, the zirconium oxide is prepared by a hydrothermal method.

In one or more embodiments, the primary sintering is carried out at a temperature of 1300~1600° C. (for example, 1350° C., 1400° C., 1450° C., 1500° C., and 1550° C.) for 1~5 h (for example, 1.5 h, 2.0 h, 2.5 h, 3.0 h, 3.5 h, 4.0 h, and 4.5 h); and preferably, the sintering is carried out at a temperature of 1400° C. for 3 h.

In one or more embodiments, the secondary sintering is carried out at a temperature of 1300~1600° C. (for example, 1350° C., 1400° C., 1450° C., 1500° C., and 1550° C.) for 1~5 h (for example, 1.5 h, 2.0 h, 2.5 h, 3.0 h, 3.5 h, 4.0 h, and 4.5 h); and preferably, the sintering is carried out at a temperature of 1550° C. for 3 h.

The primary sintering and the secondary sintering are combined, wherein the zirconium-oxide ceramic can be densified through the primary sintering, and air holes are substantially eliminated, so that a primary sintered body is obtained. By carrying out the secondary sintering on the primary sintered body under the reducing atmosphere, tetravalent cerium can be fully converted into trivalent cerium, so that the bright red ceramic appearance is obtained.

In one or more embodiments, the reducing atmosphere includes any one of a hydrogen atmosphere and a mixed gas of hydrogen and an inert gas, preferably a mixed gas of hydrogen and nitrogen, and a volume proportion of hydrogen in the mixed gas is 3~7 v % (e.g., 3.5%, 4.0%, 4.5%, 5.0%, 5.5%, 6.0%, and 6.5%).

In one or more embodiments, a method for preparing a red zirconium-oxide sintered body according to the present disclosure includes following steps:
   (I) mixing oxide of cerium, oxide of yttrium and zirconium oxide to obtain a mixture to be sintered, wherein the mixture to be sintered includes following components in mole percentage: 0.2~1.5 mol % of the oxide of cerium, 0.8~1.2 mol % of the oxide of yttrium, 0~2.5 mol % of the oxide of aluminum, and a balance is zirconium oxide; moreover, a sum of the contents of the oxide of cerium and the oxide of yttrium is 1.1~2.5 mol %; and
   (II) firstly carrying out primary sintering on the mixture obtained in the step (I) at 1300~1600° C. under normal pressure for 1~5 h, and then carrying out secondary sintering on the mixture at 1300~1600° C. in an atmosphere of the mixed gas of hydrogen and nitrogen for 1~5 h.

The present disclosure further provides a red zirconium-oxide article, which is obtained by treating the red zirconium-oxide sintered body according to the present disclosure.

It should be noted that, in order to obtain different colors, those skilled in the art could add other elements to the red zirconium-oxide sintered body, so as to obtain desired colors.

In one or more embodiments, the article includes any one of a mobile phone backboard, a watch case, a watch chain, a watch hand, and an ornament.

The present disclosure further provides an electronic product, and a mobile phone backboard of the electronic product includes the red zirconium-oxide article according to the present disclosure.

Compared with the prior art, the present disclosure at least has following beneficial effects:
   (1) the zirconium-oxide sintered body provided in the present disclosure has red appearance and toughness more than 8 MPa·m$^{1/2}$, and the three-point bending strength of the sintered body is 1000 MPa; with an expanded application scene thereof, the zirconium-oxide sintered body can be used for products such as mobile phone backboards, ornaments and dial plates, moreover, the resistance to falling of the ceramic members is improved due to the high toughness of the zirconium-oxide sintered body; and
   (2) the preparation method provided in the present disclosure is simple, and can be used to prepare the high-toughness zirconium-oxide sintered body with red appearance.

DETAILED DESCRIPTION OF EMBODIMENTS

In order to facilitate understanding the present disclosure, examples listed in the present disclosure are as follows. Those skilled in the art should know that the examples are merely to help understand the present disclosure, but should not be considered as specific limitation on the present disclosure.

Examples 1~17 and Comparative Examples 1~11

A method for preparing a red zirconium-oxide sintered body included following steps:
   (1) mixing oxide of cerium (CeO$_2$), oxide of yttrium (Y$_2$O$_3$), zirconium oxide (ZrO$_2$) and oxide of aluminum (Al$_2$O$_3$) to obtain a mixture to be sintered, wherein the mixture to be sintered was mixed according to mole percentages shown in Table 1-1; and
   (2) firstly carrying out primary sintering on the mixture obtained in the step (1) at 1500° C. under normal pressure for 3 h, and then carrying out secondary sintering on the mixture at 1500° C. in an atmosphere of the mixed gas of hydrogen and nitrogen for 3 h.

TABLE 1-1

| Example | Al$_2$O$_3$/ mol % | Ce$_2$O$_3$/ mol % | Y$_2$O$_3$/ mol % | Ce$_2$O$_3$ + Y$_2$O$_3$/ mol % | Powder Average Grain/nm |
|---|---|---|---|---|---|
| Example 1 | 0 | 0.4 | 1 | 1.4 | 220 |
| Comparative Example 1 | 0 | 0.4 | 0.6 | 1.0 | 220 |
| Comparative Example 2 | 0 | 0.1 | 1 | 1.1 | 220 |
| Example 2 | 0 | 0.8 | 1 | 1.8 | 220 |
| Example 3 | 0 | 1.2 | 1 | 2.2 | 220 |
| Example 4 | 0 | 0.8 | 0.8 | 1.6 | 220 |
| Comparative Example 3 | 0 | 1.6 | 0.8 | 2.4 | 220 |
| Comparative | 0 | 0.1 | 0.8 | 0.9 | 220 |

TABLE 1-1-continued

| Example | Al$_2$O$_3$/ mol % | Ce$_2$O$_3$/ mol % | Y$_2$O$_3$/ mol % | Ce$_2$O$_3$ + Y$_2$O$_3$/ mol % | Powder Average Grain/nm |
|---|---|---|---|---|---|
| Example 4 | | | | | |
| Example 5 | 0 | 0.8 | 1 | 1.8 | 220 |
| Example 6 | 0 | 0.8 | 1.2 | 2.0 | 220 |
| Example 7 | 0.6 | 0.8 | 1.2 | 2.0 | 220 |
| Comparative Example 5 | 0.6 | 0.8 | 2.5 | 3.3 | 220 |
| Comparative Example 6 | 0.6 | 0.8 | 3.0 | 3.8 | 220 |
| Comparative Example 7 | 0.6 | 2.0 | 1.2 | 2.2 | 220 |
| Comparative Example 8 | 0.6 | 3.0 | 1.2 | 4.2 | 220 |
| Example 8 | 1.2 | 0.8 | 1.2 | 2.0 | 220 |
| Example 9 | 0 | 0.8 | 1.2 | 2.0 | 150 |
| Example 10 | 0 | 0.8 | 1.2 | 2.0 | 385 |
| Example 11 | 0 | 0.8 | 1.2 | 2.0 | 460 |
| Example 12 | 0.6 | 0.8 | 1.2 | 2.0 | 460 |
| Comparative Example 9 | 0.6 | 0.8 | 1.2 | 4.2 | 650 |
| Comparative Example 10 | 0.6 | 0.8 | 1.2 | 4.2 | 835 |
| Comparative Example 11 | 0.6 | 0.8 | 1.2 | 4.2 | 1050 |
| Example 13 | 2.5 | 0.2 | 0.9 | 1.1 | 500 |
| Example 14 | 0 | 1.5 | 0.5 | 2.0 | 120 |
| Example 15 | 0 | 0.5 | 2.0 | 2.5 | 220 |
| Example 16 | 2.6 | 0.8 | 1.2 | 2.0 | 220 |
| Example 17 | 3.5 | 0.8 | 1.2 | 2.0 | 220 |

Performance Test 1:

The sintered bodies obtained in Examples 1~17 and Comparative Examples 1~11 were subjected to the following performance tests:
(1) three-point bending strength: the test method was GB-T 6569-2006;
(2) toughness: the test method was ISO 24370-2005; and
(3) Lab color: the test method was as follows: selecting a ceramic chip with the thickness of 1 mm, and polishing two surfaces of the ceramic chip until the smoothness Ra was less than 0.04; and placing the processed ceramic chip in a Konica Minolta device CM-3700A-U for detection, and testing the ceramic chip by adopting an SCE mode with a D65 illuminant as device illuminant.

See Table 1-2 for test results.

TABLE 1-2

| Example | Three-point Bending Strength/MPa | Toughness/ MPa·m$^{1/2}$ | L | a | b |
|---|---|---|---|---|---|
| Example 1 | 1128 | 13.5 | 30.25 | 40.15 | 36.38 |
| Comparative Example 1 | 789 | 4.38 | 33.58 | 40.13 | 38.99 |
| Comparative Example 2 | 658 | 3.99 | 45.18 | 12.33 | 20.38 |
| Example 2 | 1185 | 12.8 | 29.52 | 40.28 | 38.65 |
| Example 3 | 1209 | 12.7 | 28.4 | 43.21 | 41.05 |
| Example 4 | 1255 | 13.2 | 29.35 | 40.28 | 39.65 |
| Comparative Example 3 | 1154 | 7.68 | 37.33 | 39.88 | 37.66 |
| Comparative Example 4 | 678 | 4.89 | 45.23 | 5.89 | 15.88 |
| Example 5 | 1189 | 11.8 | 29.33 | 41.25 | 40.23 |
| Example 6 | 1267 | 9.5 | 28.12 | 43.2 | 39.89 |
| Example 7 | 1308 | 11.63 | 31.05 | 42.88 | 40.25 |
| Comparative Example 5 | 1109 | 4.65 | 31.25 | 41.26 | 39.22 |
| Comparative Example 6 | 1087 | 4.25 | 32.55 | 43.12 | 41.89 |
| Comparative Example 7 | 1106 | 4.89 | 26.78 | 41.25 | 40.36 |
| Comparative Example 8 | 1165 | 3.93 | 22.33 | 39.25 | 36.78 |
| Example 8 | 1337 | 10.94 | 32.76 | 43.16 | 42.49 |
| Example 9 | 1319 | 10.55 | 27.35 | 42.55 | 39.55 |
| Example 10 | 1165 | 9.68 | 29.54 | 41.89 | 40.22 |
| Example 11 | 1086 | 9.12 | 27.89 | 42.11 | 38.45 |
| Example 12 | 1255 | 10.56 | 29.88 | 41.78 | 40.89 |
| Comparative Example 9 | 1089 | 4.76 | 30.88 | 39.31 | 37.55 |
| Comparative Example 10 | 986 | 4.25 | 32.35 | 38.99 | 37.64 |
| Comparative Example 11 | 897 | 3.66 | 33.55 | 37.64 | 37.89 |
| Example 13 | 646 | 5.67 | 50.24 | 15.23 | 28.46 |
| Example 14 | 1050 | 7.62 | 33.28 | 40.15 | 39.48 |
| Example 15 | 1083 | 7.59 | 32.35 | 39.84 | 36.52 |
| Example 16 | 1105 | 9.54 | 40.55 | 35.89 | 49.87 |
| Example 17 | 1089 | 8.99 | 42.55 | 34.88 | 55.23 |

As can be seen from Table 1-2, for all of the zirconium-oxide sintered bodies satisfying the conditions that the oxide of cerium (trivalent cerium oxide) has a content of 0.2~1.5 mol % and that the sum of the contents of the oxide of cerium and the oxide of yttrium is 1.1~2.5 mol % (Examples 1~15), the toughness is 8 MPa·m$^{1/2}$ or higher, the three-point bending strength is 1000 MPa or higher, and a red color is presented.

It can be seen from comparison between Comparative Example 1 and Example 1 that when the content of the oxide of cerium is unchanged and the content of the oxide of yttrium is reduced, if the content of the oxide of yttrium and the oxide of cerium are less than 1.1 mol %, the sintered body cannot be stable at room temperature, and the ceramic will crack; and it can be seen from comparison between Comparative Example 2 and Example 1 that when the content of the oxide of yttrium is unchanged and the content of the oxide of cerium is reduced, if the content of the oxide of yttrium and the oxide of cerium are less than 1.1 mol %, the sintered body cannot be stable at room temperature, the ceramic will crack, and the bright red appearance cannot be obtained.

It can be seen from comparison between Comparative Example 3 and Example 4 that when the content of the oxide of yttrium is unchanged and the content of the oxide of cerium is greater than 1.5 mol %, the toughness will be reduced; and it can be seen from comparison between Comparative Example 4 and Example 4 that when the content of the oxide of yttrium is unchanged, and the content of the oxide of cerium is less than 0.2 mol %, the red appearance cannot be presented.

It can be seen from comparison among Comparative Example 5, Comparative Example 6 and Example 7 that when the content of the oxide of cerium is unchanged, and the content of the oxide of yttrium is increased, it is not the case that a higher content of the oxide of yttrium is better, and if the content of the oxide of yttrium and the oxide of cerium exceed 2.5 mol %, the toughness will be significantly reduced. It can be seen from comparison among Comparative Example 7, Comparative Example 8 and Example 7 that when the content of the oxide of cerium is increased so that the content of the oxide of yttrium and the oxide of cerium exceed 2.5 mol %, the toughness also will be significantly reduced. Therefore, either the increase of the content of the oxide of yttrium or the increase of the content of the oxide of cerium will result in significant reduction in toughness.

It can be seen from Example 16 and Example 17 that the red zirconium-oxide of the present disclosure has good compatibility with other metal oxides, and can render the desired color by adding other elements, for example, orange-colored zirconium oxide is obtained by adding aluminum oxide.

Examples 18~20

The only difference from Example 8 is that the oxide of yttrium was replaced by oxide of magnesium $MgO_2$ (Example 18), oxide of calcium CaO (Example 19) and oxide of ytterbium $Yb_2O_3$ (Example 20) in an equimolar amount.

Performance Test 2:

The performance test was performed on Examples 18~20 according to the method for performance test 1, and test results are shown in Table 2.

TABLE 2

| Example | Three-point Bending Strength/MPa | Toughness/ MPa · m$^{1/2}$ | L | a | b |
|---|---|---|---|---|---|
| Example 18 | 1052 | 9.32 | 33.65 | 42.18 | 40.28 |
| Example 19 | 1023 | 9.13 | 32.69 | 42.89 | 40.12 |
| Example 20 | 1235 | 11.87 | 33.99 | 42.68 | 41.53 |

It can be seen from Table 2 that when the yttrium oxide was replaced by other oxides in an equimolar amount, the red sintered body having toughness≥8 MPa·m$^{1/2}$ still could be obtained, but the three-point bending strength and toughness were not exhibited as well as those of the red zirconium oxide obtained by adding yttrium oxide in an equimolar amount.

The applicant states that the present disclosure illustrates the detailed process equipment and process flow of the present disclosure through the above examples, but the present disclosure is not limited to the above detailed process equipment and process flow, which means that the present disclosure must be implemented relying upon the detailed process equipment and process flow above. Those skilled in the art should know that any improvement on the present disclosure, equivalent substitutions of raw materials and addition of auxiliary components of products of the present disclosure, selection of specific modes, etc., are included in the scope of protection and the scope of disclosure of the present disclosure.

INDUSTRIAL APPLICABILITY (1) The zirconium-oxide sintered body provided in the present disclosure has red appearance and toughness more than 8 MPa·m$^{1/2}$, and the three-point bending strength of the sintered body is ≥1000 MPa; with an expanded application scene thereof, the zirconium-oxide sintered body can be used for products such as mobile phone backboards, ornaments and dial plates, moreover, the resistance to falling of ceramic members is improved due to the high toughness of the zirconium-oxide sintered body; and (2) the preparation method provided in the present disclosure is simple, and can be used to prepare the high-toughness zirconium-oxide sintered body with red appearance.

What is claimed is:

1. A red zirconium-oxide sintered body, comprising an oxide of cerium, an auxiliary metal oxide and an oxide of zirconium, wherein the auxiliary metal oxide comprises any one of an oxide of yttrium, an oxide of magnesium, an oxide of calcium and an oxide of ytterbium, or a combination of at least two therefrom; and the red zirconium-oxide sintered body satisfies conditions (1)-(4):

(1) the oxide of cerium has a content of 0.2 to 1.5 mol %;

(2) the oxide of cerium comprises a trivalent cerium oxide, wherein in the oxide of cerium, trivalent cerium, calculated based on cerium atom, has a mole percentage≥60%;

(3) a sum of the oxide of cerium and the auxiliary metal oxide in content is 1.1 to 2.2 mol %; and (4) the sintered body has fracture toughness≥8 MPa·m$^{1/2}$, wherein the oxide of cerium is calculated based on $CeO_2$, and the oxide of yttrium is calculated based on $Y_2O_3$.

2. The red zirconium-oxide sintered body according to claim 1, wherein the sintered body has a three-point bending strength≥1000 MPa.

3. The red zirconium-oxide sintered body according to claim 1, wherein the sintered body has an average grain size≤500 nm.

4. The red zirconium-oxide sintered body according to claim 1, wherein a particle size distribution of the grain size of the sintered body is 150 to 400 nm.

5. The red zirconium-oxide sintered body according to claim 1, wherein the auxiliary metal oxide is the oxide of yttrium.

6. The red zirconium-oxide sintered body according to claim 1, wherein the red zirconium-oxide sintered body further contains an oxide of aluminum.

7. The red zirconium-oxide sintered body according to claim 6, wherein the oxide of aluminum in the red zirconium-oxide sintered body, calculated based on $Al_2O_3$, has a mole percentage≤2.5 mol %.

8. The red zirconium-oxide sintered body according to claim 1, wherein in a Lab color system, the red zirconium-oxide sintered body has a value a≥25, wherein a ratio of the value a to a value b is ≥0.9, and a value L≥20.

9. A method for preparing the red zirconium-oxide sintered body according to claim 1, wherein the method comprises following steps:

(I) mixing an oxide of cerium, an auxiliary metal oxide and a zirconium oxide according to a molar ratio of conditions (a)-(c), to obtain a mixture to be sintered, wherein the condition (a) is that the oxide of cerium has a content of 0.2 to 1.5 mol %; wherein the oxide of cerium comprises a trivalent cerium oxide, wherein in the trivalent cerium, calculated based on cerium atom, has a mole percentage≥60%; the condition (b) is that a sum of the oxide of cerium and the auxiliary metal oxide in content is 1.1 to 2.2 mol %; and the condition (c) is that a balance is the zirconium oxide; and the auxiliary metal oxide comprises any one of an oxide of yttrium, an oxide of magnesium, an oxide of calcium and an oxide of ytterbium, or a combination of at least two therefrom; and (II) firstly carrying out a primary sintering on the mixture obtained in the step (I) under a normal pressure, and then carrying out a secondary sintering on the mixture under a reducing atmosphere, to obtain the red zirconium-oxide sintered body having a fracture toughness≥8 MPa·m$^{1/2}$.

10. The method according to claim 9, wherein the mixture to be sintered in the step (I) further contains an oxide of aluminum less than 2.5 mol %.

11. The method according to claim 9, wherein the zirconium-oxide sintered body has a crystal particle size≤500 nm.

12. The method according to claim 9, wherein the zirconium oxide is prepared by a hydrothermal method.

13. The method according to claim 9, wherein the primary sintering is carried out at a temperature of 1300 to 1600° C. for 1~5 h.

14. The method according to claim 9, wherein the secondary sintering is carried out at a temperature of 1300~1600° C. for 1 to 5 h.

15. The method according to claim 9, wherein the reducing atmosphere is a mixed gas of hydrogen and nitrogen, wherein a volume proportion of hydrogen in the mixed gas is 3 to 7 v %.

16. A red zirconium-oxide article, wherein the red zirconium-oxide article is obtained by treating the red zirconium-oxide sintered body according to claim 1.

17. The red zirconium-oxide article according to claim 16, wherein the article comprises any one of a mobile phone backboard, a watch case, a watch chain, a watch hand, and an ornament.

18. A red zirconium-oxide sintered body, wherein the red zirconium-oxide sintered body comprises, in mole percentage, following components:
   0.2 to 1.4 mol % of an oxide of cerium,
   0.8 to 2.0 mol % of an oxide of yttrium,
   0 to 2.5 mol % of an oxide of aluminum and
   a balance being zirconium oxide,
   wherein a sum of the oxide of cerium and the oxide of yttrium in content is 1.1 to 2.2 mol %,
   the oxide of cerium comprises a trivalent cerium oxide, wherein in the oxide of cerium, trivalent cerium, calculated based on cerium atom, has a mole percentage>60%,
   the sintered body has fracture toughness≥8 MPa·m$^{1/2}$ and
   the oxide of cerium is calculated based on $CeO_2$, and the oxide of yttrium is calculated based on $Y_2O_3$.

\* \* \* \* \*